United States Patent [19]

Okada et al.

[11] 4,403,254
[45] Sep. 6, 1983

[54] VIDEO SIGNAL PROCESSING CIRCUIT

[75] Inventors: Takashi Okada; Atsushi Matsuzaki, both of Kangawa, Japan

[73] Assignee: Sony Corporation, Tokyo, Japan

[21] Appl. No.: 177,574

[22] Filed: Aug. 13, 1980

[30] Foreign Application Priority Data

Aug. 17, 1979 [JP] Japan ................................ 54-104615
Aug. 17, 1979 [JP] Japan ................................ 54-104616

[51] Int. Cl.$^3$ .............................................. H04N 5/16
[52] U.S. Cl. ...................................... 358/171; 358/172
[58] Field of Search ................ 358/171, 172, 173, 160

[56] References Cited

U.S. PATENT DOCUMENTS 3,947,631  3/1976  Rhee ...................................... 358/171
3,985,954  10/1976  Kuniyoshi ............................ 358/171
4,110,787  8/1978  Parker ................................... 358/172

OTHER PUBLICATIONS

Automatic Black Level Set, Blanchard, RCA Technical Notes, Dec. 19, 1975, TN No. 1137.

*Primary Examiner*—Michael A. Masinick
*Attorney, Agent, or Firm*—Lewis H. Eslinger; Alvin Sinderbrand

[57] ABSTRACT

A video signal processing circuit is disclosed which has a wave-forming circuit for setting the level of an input video signal to a predetermined first D.C. level, which is higher than the pedestal level of the input video signal, at least during the blanking period of the input video signal, and producing a wave-formed signal; a peak-hold circuit for detecting and holding the level of the darkest peak of the wave-formed signal and producing a peak-hold output signal; and a black level control circuit controlled by the peak-hold output signal for controlling the D.C. level of the input video signal so that the darkest level of the input video signal coincides with a predetermined second D.C. level.

11 Claims, 28 Drawing Figures

FIG. 3A(S0) 
FIG. 3B(P1) 
FIG. 3C(S2) 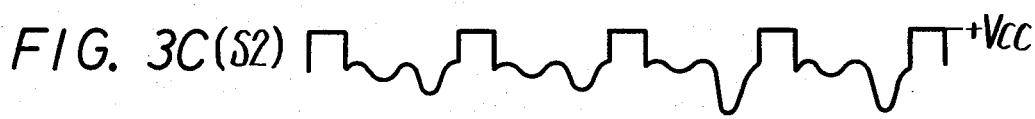 +Vcc
FIG. 3D(S3) 
FIG. 3E(S4) 
FIG. 3F(P2) 
FIG. 3G(S5) 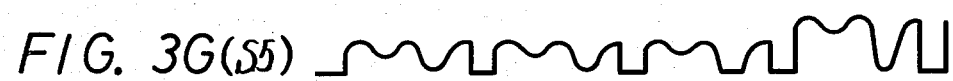

FIG. 6
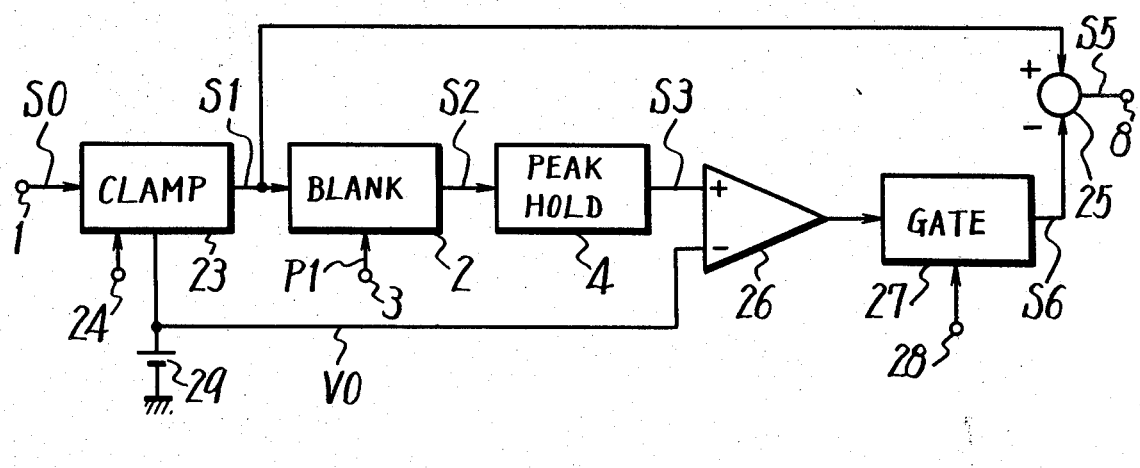
FIG. 7A (S0) 
FIG. 7B (S2) 
FIG. 7C (S3) 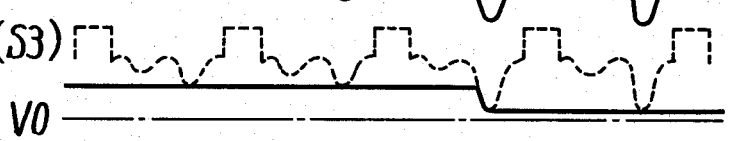
FIG. 7D (S6) 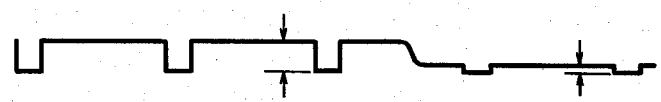
FIG. 7E (S5) 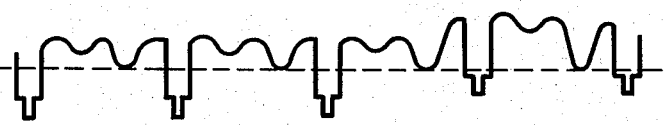

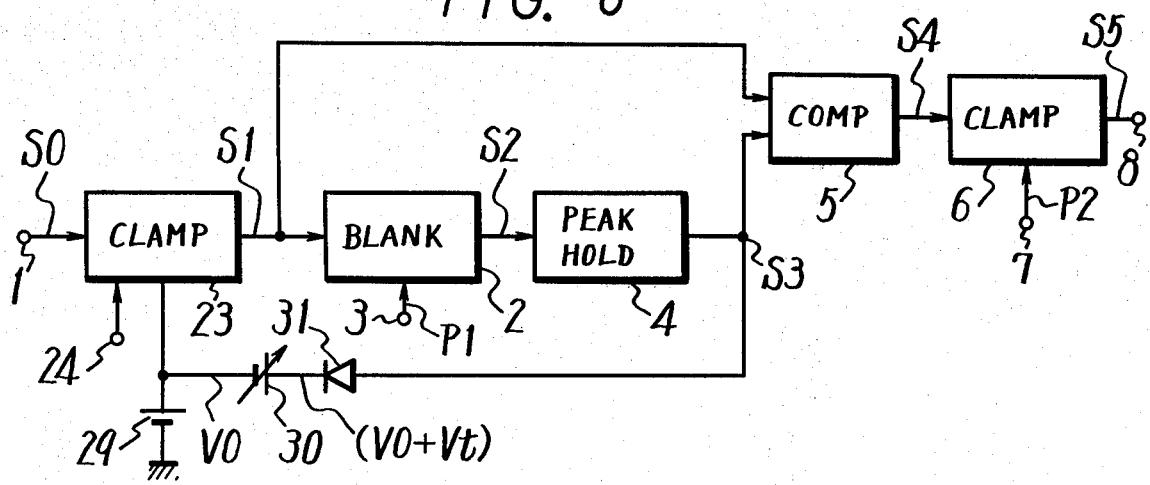
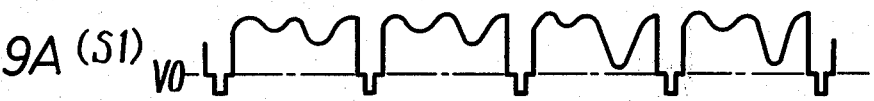
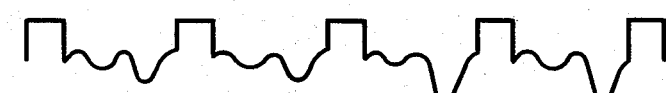
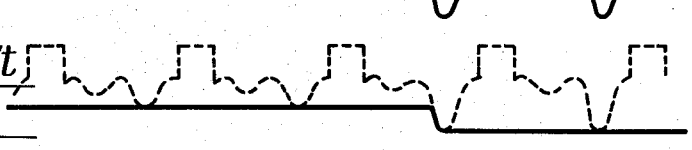

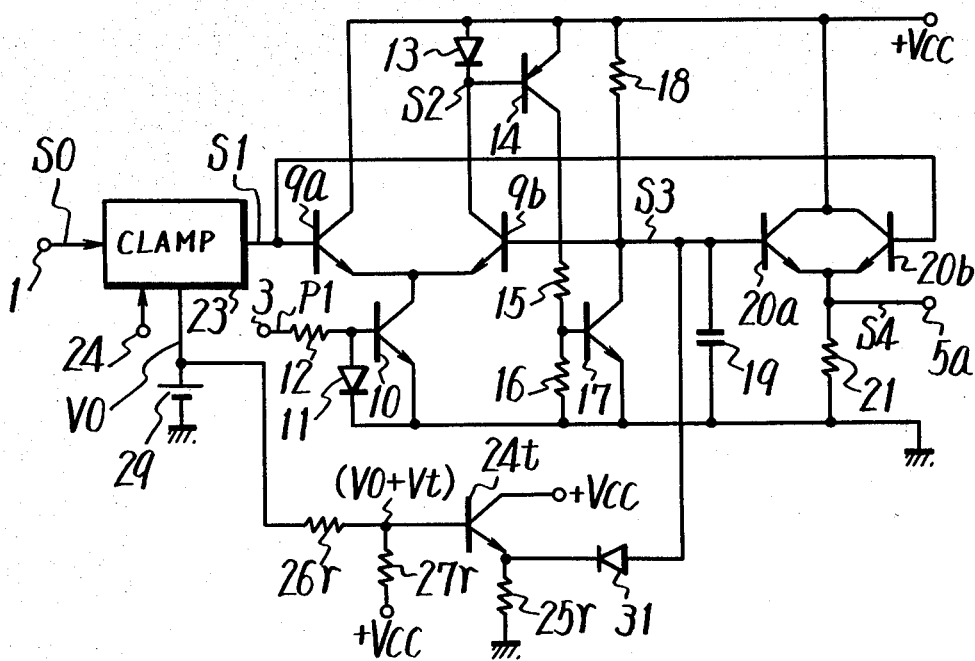
FIG. 10
FIG. 11A $(V_0+V_t)$
FIG. 11B $(S_4)$

VIDEO SIGNAL PROCESSING CIRCUIT

BACKGROUND OF THE INVENTION

1. Field of the Invention

The present invention relates generally to a video signal processing circuit, and is directed more particularly to a video signal processing circuit for use in a television receiver.

2. Description of the Prior Art

In the prior art, a video signal applied to drive the cathode of a cathode ray tube is selected such that, as shown in FIG. 1, the screen of the cathode ray tube becomes darkest at a pedestal level V1 of the video signal and becomes brightest at a white level V2 of the video signal. This is accomplished by setting the cut off level of the cathode ray tube (at which the screen becomes black) at the pedestal level of the video signal, thus completely restoring the D.C. component. In this situation, any change from station to station of the set up level of the video signal (i.e., the small difference between the pedestal level and the black signal level) is manifested as a change in the black signal level, with the result that when a broadcast signal of a station with a large set up level is received, the black parts of the picture appear somewhat gray. To avoid this defect, in a prior art television receiver the D.C. transferring ratio is lowered to a value in the range of about 0.5 to 0.9, causing fluctuations in the black level due to fluctuations in the set up level to be relatively small. However, the fluctuation of the black level can not be sufficiently removed in this manner.

OBJECTS AND SUMMARY OF THE INVENTION

Accordingly, an object of the present invention is to provide a novel video signal processing circuit free from the defect inherent in the prior art.

Another object of the invention is to provide a video signal processing circuit in which the darkest level in the video period signal is detected, defined to be the black level, and set at the cut-off level of a cathode ray tube, to avoid the fluctuation of the black level due to fluctuation of the set up level.

A further object of the invention is to provide a video signal processing circuit in which the darkest level at least as high as a predetermined level in a video signal is detected, defined to be the black level, and set at the cut-off level of a ctahode ray tube, to avoid the fluctuation of the black level due to fluctuation of the set up level, without losing the naturality of a picture screen.

According to one embodiment of the present invention, a video signal processing circuit is provided which comprises:

a wave-forming circuit for setting the level of an input video signal to a predetermined first D.C. level, which is higher than the pedestal level of said input video signal, at least during the blanking period of said input video signal, and producing a wave-formed signal;

a peak-hold circuit for detecting and holding the darkest level of the wave-formed signal and producing a peak-hold output signal; and black level control means controlled by said peak hold output signal for controlling the D.C. level of said input video signal so that the darkest level of said input video signal coincides with a predetermined second D.C. level.

The other objects, features and advantages of the present invention will become apparent from the following description, taken in conjunction with the accompanying drawings, in which like references designate like elements and parts.

BRIEF DESCRIPTION OF THE DRAWINGS

FIGS. 3A-3G are wavefrom diagrams used to explain the operation of the example shown in FIG. 2;

FIG. 6 is a block diagram showing another example of the invention;

FIGS. 7A-7E are waveform diagrams used to explain the example of the invention shown in FIG. 6;

FIG. 8 is a block diagram showing a further example of the invention;

FIGS. 9A-9G are waveform diagrams used to explain the operation of the example shown in FIG. 8;

FIG. 10 is a circuit diagram showing a practical example of that shown in FIG. 8; and FIGS. 11A and 11B are waveform diagrams used to explain the operation of the example shown in FIG. 10.

DESCRIPTION OF THE PREFERRED EMBODIMENTS

The present invention will be hereinafter described with reference to the attached drawings.

Figure 2:
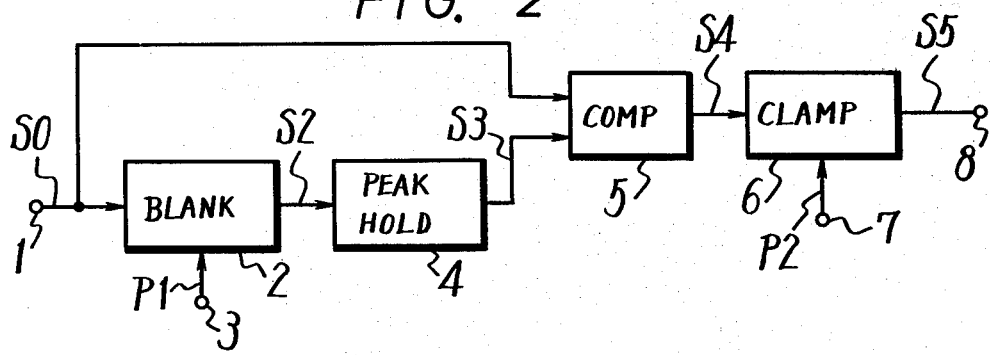
FIG. 2 is a block diagram showing an example of the present invention.

Turning to FIG. 2, the fundamental construction of a video signal processing circuit according to the present invention will be now described.

In FIG. 2, 1 designates an input terminal to which an input video signal $S_0$ shown in FIG. 3A is fed from a video detecting circuit (not shown in FIG. 2). The input video signal $S_0$ is then supplied to a blanking circuit 2 where the video signal is blanked over a period somewhat longer than the horizontal blanking period of the video signal by a blanking pulse $P_1$ shown in FIG. 3B, which is fed thereto through a terminal 3. Then, the blanking circuit 2 generates an output signal $S_2$ which has a voltage source potential or voltage $+V_{cc}$ in a period corresponding to the blanking period of the input video signal, as shown in FIG. 3C. The output signal $S_2$ is then fed to a peak hold circuit 4 which in turn produces a peak-hold output signal $S_3$ which corresponds to the peak level in the black direction of the video signal as shown in FIG. 3D. The input video signal $S_0$ from the input terminal 1 and the peak-hold output signal $S_3$ from the peak hold circuit 4 are both supplied to a comparator 5. This comparator 5, which may be an analog OR circuit, that one of signals $S_0$ and $S_3$ which has a level nearer to the white level than the other and thus has an output signal $S_4$ as shown in FIG. 3E. The output signal $S_4$ from the comparator 5 is supplied to a clamp circuit 6, which is also supplied with a clamp pulse $P_2$, shown in FIG. 3F, through a terminal 7. The clamp circuit 6 produces at its output terminal 8 a video signal $S_5$ in which the level during blanking periods is fixed at a predetermined level as shown in FIG. 3G.

Figure 4:
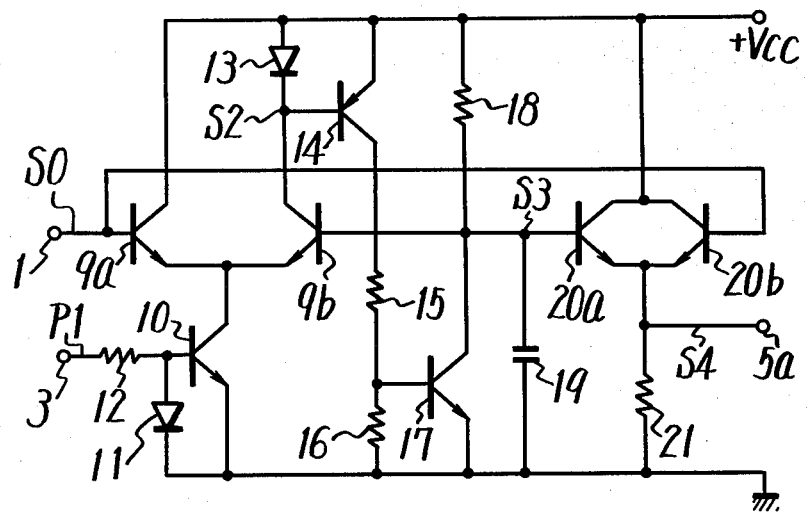
FIG. 4 is a circuit diagram showing a practical example of the invention.

FIG. 4 shows an example of a specific practical circuit which will realize the above described operation of the fundamental construction shown in FIG. 2. In FIG. 4, 9a and 9b designate a pair of transistors whose emitters are connected together to a constant current source consisting of a transistor 10, a diode 11 and a resistor 12. The terminal 3, connected through the resistor 12 to the base of the transistor 10, is supplied with the blanking pulse $P_1$ as set forth above so that, during the period in which the transistor 10 is made OFF by the blanking pulse $P_1$, the collector of the transistor 9b is substantially at the power source voltage $+V_{cc}$. The collector output $S_2$ of this transistor 9b is derived through a current mirror circuit consisting of a diode 13 and a PNP transistor 14.

A series connection of resistors 15 and 16 is inserted between the collector of the transistor 14 and the ground, and the connection point between resistors 15 and 16 is connected to the base of an NPN transistor 17 which has the emitter grounded and the collector connected to the base of the transistor 9b and also to the connection point between a resistor 18 and a capacitor 19. The series connection of the resistor 18 and capacitor 19 is connected between the voltage source terminal $+V_{cc}$ and the ground and with the transistor 17 forms the peak hold circuit 4 shown in FIG. 2. When the voltage at the base of the transistor 9a is higher than that at the base of the transistor 9b, no current flows through the diode 13 and the transistors 14 and 17 and the capacitor 19 is charged up by the power source voltage through the resistor 18. Said capacitor 19 and resistor 18 are selected such that the time constant is very large. When the terminal voltage across the capacitor 19 (the voltage at the base of the transistor 9b) tends to become higher than the base voltage of the transistor 9a, current flows through the diode 13 and the transistors 14 and 17 and the capacitor 19 is discharged to lower its terminal voltage. Thus, feedback is applied in such a way that the base voltages of the transistors 9a and 9b become equal to each other, so that the level nearest to the black side in the video period is held and the output signal $S_3$ is applied to the base of a transistor 20a.

A transistor 20b is provided whose collector and emitter are respectively connected to those of the transistor 20a. The connection point between the collectors of transistors 20a and 20b is connected to the power source terminal $+V_{cc}$, and the connection point between their emitters is connected through a resistor 21 to the ground and also to an output terminal 5a. Transistors 20a and 20b form the comparator 5 shown in FIG. 2, and the input video signal $S_0$ is applied to the base of the transistor 20b. The one of signals $S_0$ and $S_3$ whose level is higher than that of the other is derived as the output signal $S_4$ from comparator 5.

To the output terminal 5a of the comparator 5 is connected the clamp circuit 6 described in connection with FIG. 2. In practice, as the clamp circuit 6, a well-known clamp circuit such as a feedback clamp circuit or the like can be used; therefore, the clamp circuit 6 is not shown in FIG. 4.

Figure 1:
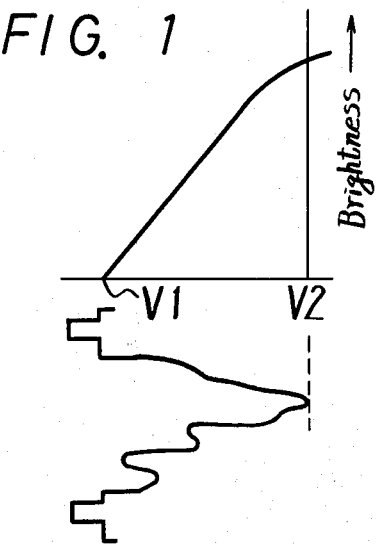
FIG. 1 is a graph used to explain how a cathode ray tube is driven by a video signal.
Figure 5:
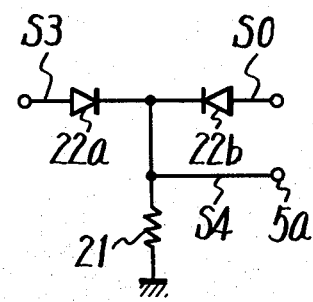
FIG. 5 is a circuit diagram showing another example of a part of FIG. 4.

As shown in FIG. 5, the comparator 5 may alternatively be comprised of two diodes 22a and 22b connected in such a manner that their cathodes are connected together to the ground through the resistor 21 and also to the output terminal 5a.

As will be easily understood from the above described example of the invention, according to the present invention the level nearest to the black side in the video period is detected, held, defined to be the black level, and set at the cut-off level (black level) of the cathode ray tube automatically, so that fluctuation of the black level due to fluctuation of the set up level between stations such as may occur in the prior art can be effectively avoided by the invention.

It may be seen that the video signal $S_2$, after having been subjected to the blanking process, is used to determine the level nearest to the black side and to clamp it to a predetermind level corresponding to the cut-off level. It could not, however, be used to drive the cathode ray tube directly, because in this case a blanking period is selected wider than the horizontal blanking period of the video signal $S_0$. The level during said selected blanking period is a high level on the white side, so that even if the blanking process were performed at the stage prior to the cathode ray tube, a pulsative signal at a high level on the white side would remain. Such a difficulty is removed by the present invention.

FIG. 6 shows another example of the invention. In this example, an input video signal $S_0$ shown in FIG. 7A is supplied to a clamp circuit 23 and its pedestal level is clamped therein to a reference voltage $V_0$, which is the voltage of a clamp voltage source 29. Clamp circuit 23 is driven by a clamp pulse fed to the clamp circuit 23 through a terminal 24. An output signal $S_1$ from the clamp circuit 23 is fed to a subtracter 25 and to a blanking circuit 2. This blanking circuit 2 is similar to that shown in FIG. 2 and produces an output signal $S_2$ shown in FIG. 7B which is fed to a peak hold circuit 4. An output signal $S_3$ from the peak hold circuit 4 and the reference voltage $V_0$ both shown in FIG. 7C are fed to a comparator 26.

The comparator 26 compares the signals and detects the level difference therebetween. The output from the comparator 26 is fed through a gate circuit 27 to the subtracter 25. The gate circuit 27 is also supplied with a control pulse similar to the blanking pulse $P_1$ through a terminal 28. The output signal $S_6$ of gate 27, which is supplied to subtracter 25, has a predetermined level during the period of the control pulse and is at the level of the output from the comparator 26 at all other times during the video period, as shown in FIG. 7D. The output signal of the gate circuit 27 is subtracted from the video signal $S_1$ in the subtracter 25 so that the subtracter 25 delivers to the output terminal 8 an output signal $S_5$ whose level nearest to the black side in the video period coincides with a predetermined black level, as shown in FIG. 7E.

The example of the invention shown in FIG. 6, thus can avoid the fluctuation of the black level owing to the fluctuation of the set up level by a method similar to that of the first example of the present invention.

In the above examples of the invention shown in FIGS. 2 and 6, an undesired phenomenon may appear, depending on the nature of the input video signals. For example, in the case of a video signal which is generally bright and low in contrast ratio, when this video signal is processed by this invention, the part of the video signal that is inherently bright becomes excessively dark, and hence the reproduced picture appears unnatural.

A further example of the invention, which can avoid the above undesired phenomenon, will be now described with reference to FIG. 8. In brief, the example of FIG. 8 is formed by adding clamp circuit 23 and the clamp voltage source 29 of the example shown in FIG.

6 to the example shown in FIG. 2, and further adding a threshold voltage source 30 and a diode 31.

In the example of the invention shown in FIG. 8, the input video signal $S_0$ from the video detecting circuit is fed through the input terminal 1 to the clamp circuit 23 to which the clamp pulse is applied through the terminal 24. Thus, the clamp circuit 23 produces a video signal $S_1$ whose pedestal level is clamped to a predetermined level $V_0$ as shown in FIG. 9A. This video signal $S_1$ is applied to the blanking circuit 2 and blanked over a period somewhat wider than the horizontal blanking period of the video signal by a blanking pulse $P_1$ shown in FIG. 9B and applied to be blanking circuit 2 through a terminal 3. Then, the blanking circuit 2 produces an output signal $S_2$ of which the segments corresponding to the blanked periods have a level of, for example, the power source voltage as shown in FIG. 9C. This output signal $S_2$ is supplied to a peak hold circuit 4 which in turn produces a peak-hold output signal $S_3$ which corresponds to the peak level in the black direction of the video signal during the video or information period as shown in FIG. 9D.

A voltage $(V_0+V_t)$ is applied to the output side of the peak hold circuit 4 through the diode 31, in the forward direction thereof, so that, disregarding the forward voltage drop of the diode 31, when the output $S_3$ is lower than the voltage $(V_0+V_t)$ in level, the diode 31 is cut off and the output $S_3$ corresponds to the video signal. However when the output $S_3$ is higher than $(V_0+V_t)$ in level, the diode 31 is made conductive and the output $S_3$ becomes the level of $(V_0+V_t)$.

The video signal $S_1$ from the clamp circuit 23 and the output $S_3$ from the peak hold circuit 4 are fed to a comparator 5. The output of comparator 5 is the one of signals $S_1$ and $S_3$ which is closer to the white side than the other and hence delivers an output signal $S_4$ shown in FIG. 9E. The output signal $S_4$ from the comparator 5 is fed to a clamp circuit 6 to which a clamp pulse $P_2$ shown in FIG. 9F is fed through a terminal 7. Thus, at an output terminal 8 from the clamp circuit 6 is delivered a video signal $S_5$ whose blanking periods are arranged to be at a predetermined level as shown in FIG. 9G.

FIG. 10 shows details of a circuit for practicing the embodiment of the present invention shown in FIG. 8. In FIG. 10, the parts and elements corresponding to those of FIGS. 4 and 6 are makred with the same references and their description will be omitted.

Now, the difference between the examples of FIG. 10 and those of FIGS. 4 and 6 will be described. In the example of the invention shown in FIG. 10, the connection point between the resistor 18 and capacitor 19 is connected through a diode 31 to the emitter of a transistor 24t. This emitter of the transistor 24t is grounded through a constant current resistor 25r which is selected to have a high resistance, and the collector of the transistor 24t is connected to the power source terminal at a voltage of $+V_{cc}$. The base of the transistor 24t is connected through a resistor 26r to the clamp voltage source 29 and also through a resistor 27r to the power source terminal at a voltage of $+V_{cc}$. In this case, by selecting the resistance values of the resistors 26r and 27r, the voltage at their connection point, i.e., the base voltage of the transistor 24t, can be set at $(V_0+V_t)$, and the base-emitter voltage drop of the transistor 24t has such a polarity as to cancel the forward voltage drop of the diode 31. Thus, the output $S_3$ is prevented from exceeding the voltage $(V_0+V_t)$.

According to the example of the invention shown in FIG. 8, when a video signal $S_1$ corresponding to a bright picture, whose level is higher than the predetermined voltage $(V_0+V_t)$ as shown in FIG. 11A, is fed to the circuit, the peak-hold output $S_3$ becomes $(V_0+V_t)$, and accordingly the output $S_4$ from the comparator 5 becomes as shown in FIG. 11B by the solid line. On the other hand, in the embodiments shown in FIGS. 2 and 6, which merely detect and hold the level of the video signal nearest to the black side in the video period and make such held level coincident with the cut off level of the cathode ray tube, it is possible that the video signal corresponding to a picture that is bright and low in contrast ratio could be converted to a video signal of a dark picture as shown in FIG. 11B by the broken line.

According to the example of the invention shown in FIG. 8, on the contrary, this can not occur because when the video signal has a level higher than the predetermined level $(V_0+V_t)$, no peak hold operation is carried out.

The present invention can be applied not only to a television receiver as in the above examples, but also to situations in which the output from a television camera is processed; that is, when the level of the output signal from the television camera nearest to the black level and also nearer than the predetermined level to the black level, is detected, held and then made coincident with the set up level.

Although illustrative embodiments of this invention have been described in detail herein, with reference to the accompanying drawings, it is to be understood that the invention is not limited to those precise embodiments, and that various changes and modifications may be effected therein by one skilled in the art without departing from the spirit and scope of the invention, as defined in the appended claims.

We claim as our invention:

1. A video signal processing circuit for an input video signal representing a video picture and having a D.C. level, a pedestal level, and a blanking period, said processing circuit comprising:

a wave-forming means operative during at least said blanking period for establishing the amplitude level of said input video signal during the operating period thereof to be equal to a predetermined first D.C. level, which is higher than said pedestal level of said input video signal, and producing a wave-formed signal;

peak-hold circuit means for detecting and holding that level of the wave-formed signal representing the darkest level of the video picture, and producing a peak-hold output signal; and black level control means responsive to said peak-hold output signal for setting the D.C. level of said input video signal at such a level that the level of said input video signal representing said darkest level of the video picture coincides with a predetermined second D.C. level.

2. A video signal processing circuit according to claim 1; wherein said predetermined second D.C. level is substantially equal to a cut off level of a cathode ray tube to which the output signal of said black level control means is adapted to be supplied.

3. A video signal processing circuit according to claim 1; wherein said black level control means includes;

comparator means for comparing said input video signal with said peak-hold output signal, and producing an output signal corresponding to the higher of said input video and peak-hold output signals; and clamp means for clamping the output of said comparator means at said predetermined second D.C. level during the blanking period of said input video signal.

4. A video signal processing circuit according to claim 1; wherein said black level control means includes:

a clamp voltage source for supplying said second predetermined D.C. level;

clamp means for clamping the pedestal level of said input video signal at said second predetermined D.C. level;

first subtracting means for subtracting said second predetermined D.C. level from said peak-hold output signal; and second subtracting means for subtracting the output of said first subtracting means from the output of said second clamp means, and producing an output signal.

5. A video signal processing circuit according to claim 1; wherein said black level control means includes:

a clamp voltage source for supplying said second predetermined D.C. level;

clamp means for clamping the pedestal level of said input video signal at said second predetermined D.C. level; and a threshold voltage source and unidirectional means connected in series between said peak-hold circuit and said clamp voltage source.

6. A processing circuit for a video signal having an information portion variable between a minimum level representing the darkest level of a video picture reproducible therefrom and a maximum level representing the brightest level of the reproducible video picture, said processing circuit establishing a substantially constant minimum level and relative to which the remainder of said information portion varies, comprising peak hold means for holding the minimum level of said information portion of the video signal; comparator means for comparing said video signal to the held level and for supplying as an output thereof that portion of the video signal which exceeds said held level; and clamping means for clamping the minimum level of said output of said comparator means to a predetermined D.C. level.

7. The circuit of claim 6 further comprising threshold means for producing a maximum voltage level; and means for coupling said maximum voltage level to said peak hold means to maintain the minimum level held by said peak hold means no greater than said maximum voltage level.

8. The circuit of claim 6 further comprising blanking means for supplying said video signal to said peak hold means for blanking said video signal during and greater than the normal horizontal blanking period thereof.

9. A processing circuit for a video signal having a horizontal blanking period and an information portion variable between a minimum level representing the darkest level of a video picture reproducible therefrom and a maximum level representing the brightest level of the reproducible video picture, said processing circuit establishing a substantially constant minimum level and relative to which the remainder of said information portion varies, comprising clamping means for clamping said video signal, during each horizontal blanking period thereof, to a reference level; peak hold means for holding the minimum level of said information portion of the clamped video signal; means for producing a difference signal representing the difference between the held level and said reference level; and subtracting means for subtracting said difference signal from the clamped video signal.

10. The circuit of claim 9 further comprising blanking means for supplying the clamped video signal to said peak hold means for blanking said clamped video signal during and greater than said horizontal blanking period thereof.

11. The circuit of claim 10 further comprising gating means for gating said difference signal to said subtracting means only during the information portion of said video signal.

* * * * *